United States Patent [19]

Van Davelaar

[11] Patent Number: 5,059,164
[45] Date of Patent: Oct. 22, 1991

[54] SPIRAL TUBE WINDING METHODS AND APPARATUS INCLUDING PLY BREAK SENSING

[75] Inventor: Peter C. Van Davelaar, Richmond, Va.

[73] Assignee: Philip Morris Incorporated, New York, N.Y.

[21] Appl. No.: 493,720

[22] Filed: Mar. 15, 1990

[51] Int. Cl.$^5$ .................. B31C 3/00; B31C 11/04
[52] U.S. Cl. .......................... 493/12; 493/24; 493/27; 493/279
[58] Field of Search ............ 493/12, 24, 27, 276, 493/278, 279, 280, 281, 299, 300, 301

[56] References Cited

U.S. PATENT DOCUMENTS

| 3,044,423 | 7/1962 | Pottle | 112/2 |
|---|---|---|---|
| 3,087,393 | 4/1963 | Pottle | 93/94 |
| 3,165,034 | 1/1965 | Cvacho | 82/53.1 |
| 3,165,985 | 1/1965 | Pottle | 93/94 |
| 3,928,844 | 12/1975 | Meihofer | 226/11 |
| 4,242,167 | 12/1980 | Hoffmann | 156/357 |
| 4,416,651 | 11/1983 | Sullivan et al. | 493/12 |

Primary Examiner—Frederick R. Schmidt
Assistant Examiner—John A. Marlott
Attorney, Agent, or Firm—Robert R. Jackson

[57] ABSTRACT

In a spiral tube winder, the plies going to the winding mechanism are monitored to make sure that no ply is broken. If any ply breaks, the machine is stopped so that the broken ply does not become entangled in the apparatus, especially in the glue applying portion of the apparatus. The ply break detection system is automatically activated for each ply lane that is in use so that plies can be added while the machine is in operation, with the result that the ply break protection for each such added ply comes on automatically after that ply has been added.

12 Claims, 6 Drawing Sheets

SPIRAL TUBE WINDING METHODS AND APPARATUS INCLUDING PLY BREAK SENSING

BACKGROUND OF THE INVENTION

This invention relates to spiral tube winding methods and apparatus, and more particularly to such methods and apparatus in which the presence or absence of various possible plies being wound to form the tube is sensed to at least partly control the operation of the tube winder.

Spiral tube winders which wind one or more longitudinal strips or plies of paper, plastic, foil, etc., on a mandrel to form a continuously advancing tube are well known as shown, for example, by Meyer U.S. Pat. No. 4,473,368. Such machines typically include a glue roller or other means for applying glue to at least one of the plies going to the mandrel. If any ply to which glue is being applied breaks between the glue application point and the mandrel, that ply may become fouled in the glue applying apparatus. This can damage the glue application apparatus and/or can make resuming normal operation a considerable chore (e.g. by necessitating partial disassembly and/or extensive cleaning of the glue application apparatus).

It is therefore an object of this invention to improve spiral tube winding methods and apparatus.

It is a more particular object of this invention to provide spiral tube winders which stop automatically whenever one of the plies being glued breaks.

In addition to the foregoing, spiral tube winders are sometimes constructed to wind various numbers of plies. If ply break sensing is provided, it must be possible to activate it for only those ply lanes which are currently in use. If such activation must be performed by the human operator of the apparatus, the operator may sometimes forget that a ply has been added and fail to activate the ply break detector for the lane handling that ply. If that ply breaks, the machine will not stop as the operator expects, and all of the foregoing problems may result even though the machine is equipped with a ply break sensor system.

It is therefore another object of this invention to provide a ply break sensor system which automatically detects which ply lanes are in use so that a break in the ply in any of those lanes can be detected in order to stop the machine.

SUMMARY OF THE INVENTION

These and other objects of the invention are accomplished in accordance with the principles of the invention by providing a sensor for detecting the presence or absence of a ply in each ply lane in which the ply (if present) passes through glue application apparatus. If a ply is present in a given lane when the machine starts (or for a predetermined time interval while the machine is in operation), ply break detector logic associated with that lane is activated. The ply break detector logic for all other lanes remains inactivated. If the sensor and ply break detector logic for any activated lane subsequently detects that the associated ply is absent, the ply break detector logic produces an output signal which is used to stop the machine. For example, this output signal may be used to stop the winder belt motor and the glue application apparatus, and also to remove all plies from the glue application apparatus.

Further features of the invention, its nature and various advantages will be more apparent from the accompanying drawings and the following detailed description of the preferred embodiments.

DETAILED DESCRIPTION OF THE PREFERRED EMBODIMENTS

Although several other commonly assigned U.S. patent applications are mentioned in the ensuing discussion, it is not believed that the information contained in, or the subject matter covered by, any of those other applications is essential to understanding or practicing the present invention.

Figure 1:
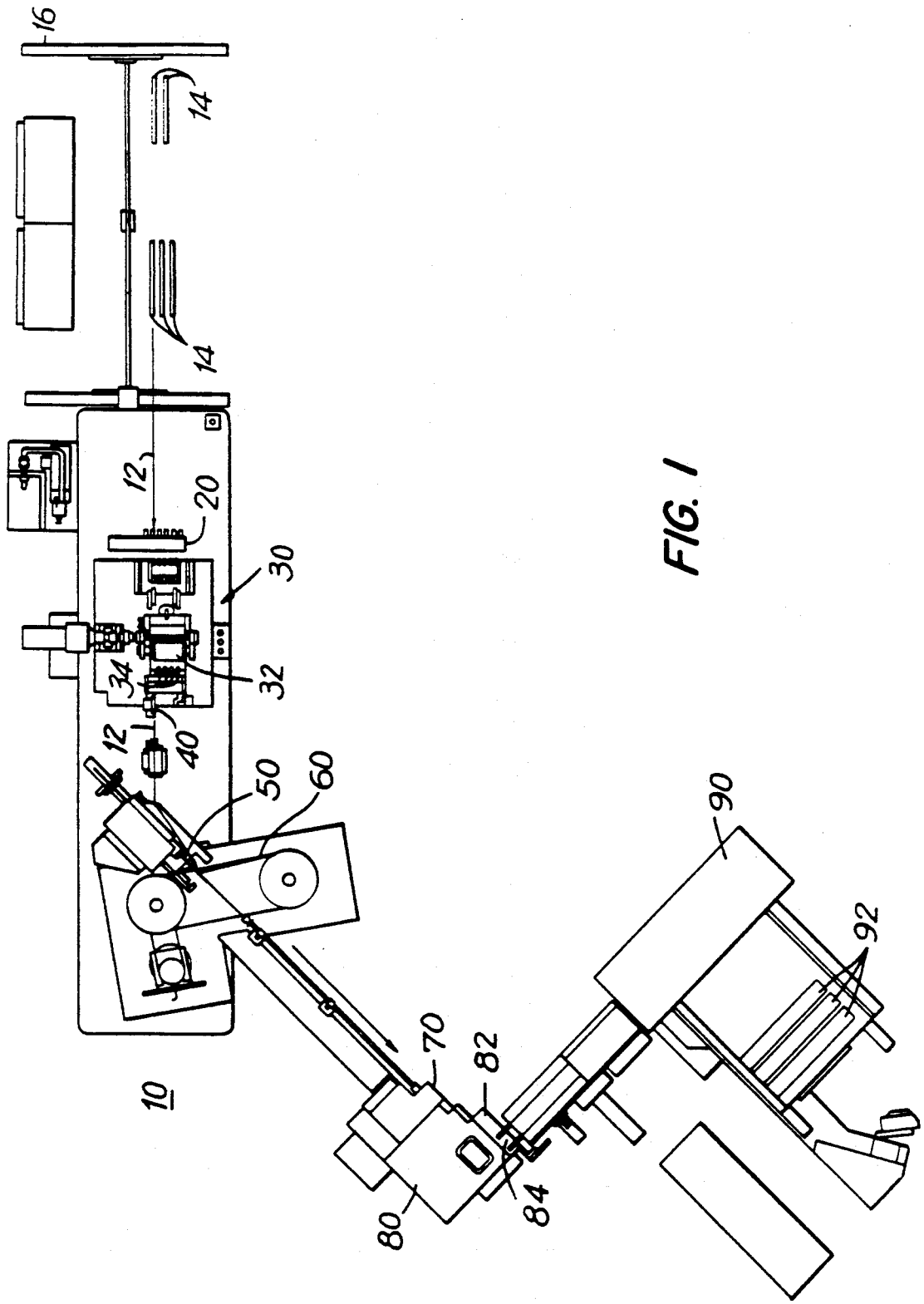
FIG. 1 is a plan view of an illustrative embodiment of tube winding apparatus constructed in accordance with the principles of this invention.

The illustrative tube winding apparatus 10 shown in FIG. 1 is capable of winding tubes made up of as many as five strips or plies 12 (only a representative one of which is shown (in part) in FIG. 1). Plies 12 are fed in side-by-side (moving to the left as viewed in FIG. 1) from supply rolls 14 which are removably mounted on bobbin stand 16.

As each ply 12 enters the tube winding machine, it passes splice detect assembly 20. Splice detect assembly 20 (discussed in more detail in commonly assigned U.S. patent application Ser. No. 493,718, filed Mar. 15, 1990, which is hereby incorporated by reference herein) includes a splice detector associated with each ply for detecting splices in the associated ply. As discussed in application Ser. No. 493,718, this splice detection information is used to reject finished lengths of tube which contain splices.

From splice detect assembly 20 plies 12 move (to the left as viewed in FIG. 1) through apparatus 30 (described in more detail in commonly assigned U.S. patent application Serial No. 493,755, filed Mar. 15, 1990, which is also hereby incorporated by reference herein) which performs such tasks as appropriately tensioning each ply and applying glue from glue roller 32 to at least some of the plies. In the depicted illustrative embodiment glue is not applied to the ply which is nearest the top of FIG. 1 and which becomes the innermost ply in the finished tube. However, glue is applied to all of the other plies, and therefore, in accordance with the present invention, each of the other ply lanes has a ply detector or sensor 34 for sensing the presence or absence of an associated ply in that lane between glue roller 32 and mandrel 50. A possible construction of each of sensors 34 is shown in more detail in FIG. 2 and described in more detail below. The topmost lane (in which the ply 12 does not receive glue) does not require a ply sensor 34. This topmost ply passes in contact with meter wheel 40 so that the topmost ply causes the meter wheel to rotate at the same peripheral speed that the ply is travelling. An encoder associated with meter wheel 40 produces an output signal proportional to the speed of the meter wheel. As is discussed in more detail in commonly assigned U.S. patent application Ser. No. 493,756, filed Mar. 15, 1990, (which is hereby incorporated by reference herein), this signal is used to control various other functions of the machine such as the speed of glue roller 32 and the speed of the cutter 70 which periodically cuts off finished lengths of tube as described below. If the topmost ply breaks, meter wheel 40 will stop, and this can be used to stop the machine in a manner similar to the way in which the machine is stopped in accordance with the present invention if any one of sensors 34 detects that the associated ply has broken.

From elements 34 and 40 plies 12 continue (to the left as viewed in FIG. 1) until they reach and wrap around mandrel 50. Belt 60 is wrapped around the plies on mandrel 50 and is driven to cause the plies to be pulled toward and wrap around the mandrel, thereby forming a continuous spiral-wound tube on the mandrel. Belt 60 also causes this tube to continuously advance along mandrel 50 toward the lower left as viewed in FIG. 1. By the time the tube has reached the end of mandrel 50 (prior to cutter 70), the glue (applied at glue roller 32 as described above) has set sufficiently to allow further processing of the tube as will now be described.

Cutter 70 periodically cuts transversely through the continuously advancing tube to produce finished lengths of tube of predetermined length. These finished lengths of tube continue to advance lengthwise one after another into accept/reject mechanism 80. If a tube length has been selected for rejection (e.g., because it contains a splice from one or more of input strips 12), it is deflected to the side (e.g., by momentary interruption of an air flow required for continued travel of the tube along an axis extending from mandrel 50) and exits from the apparatus via reject chute 82. If not rejected as described above, the tube continues past reject chute 82 to accept chute 84 where it begins to be conveyed to the side toward tray filler 90. Tray filler 90 fills successive trays with finished tubes and discharges the filled trays to allow the finished tubes to be conveyed to other apparatus (not shown) for use of the tubes.

Figure 2:
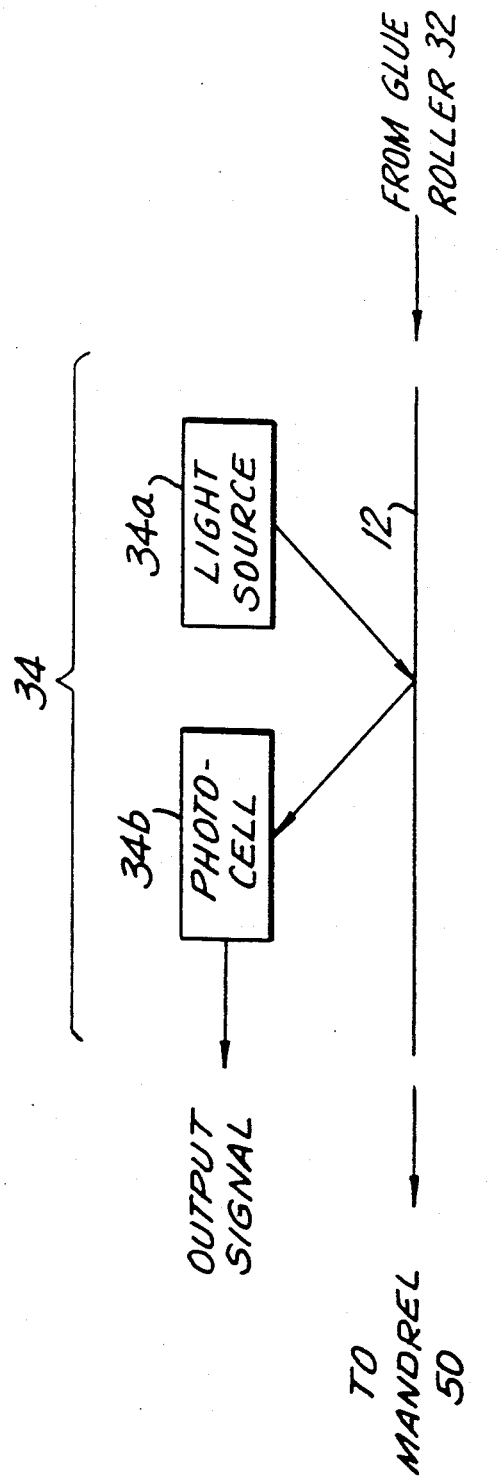
FIG. 2 is a simplified elevational view (partly in block diagram form) of a portion of the apparatus of FIG. 1.

As mentioned above, the purpose of sensors 34 is to detect the presence or absence of a ply in each of the lanes of the machine in which the ply (if present) receives glue from glue roller 32. As shown in FIG. 2, a typical ply sensor 34 may include a light source 34a for directing light to one of the plane surfaces of the associated ply 12. If that ply is present, the surface of the ply reflects the light from light source 34a to photocell 34b which produces an output signal proportional to the amount of light it receives. Accordingly, the level of the output signal of photocell 34b indicates whether or not ply 12 is present.

Figure 3:
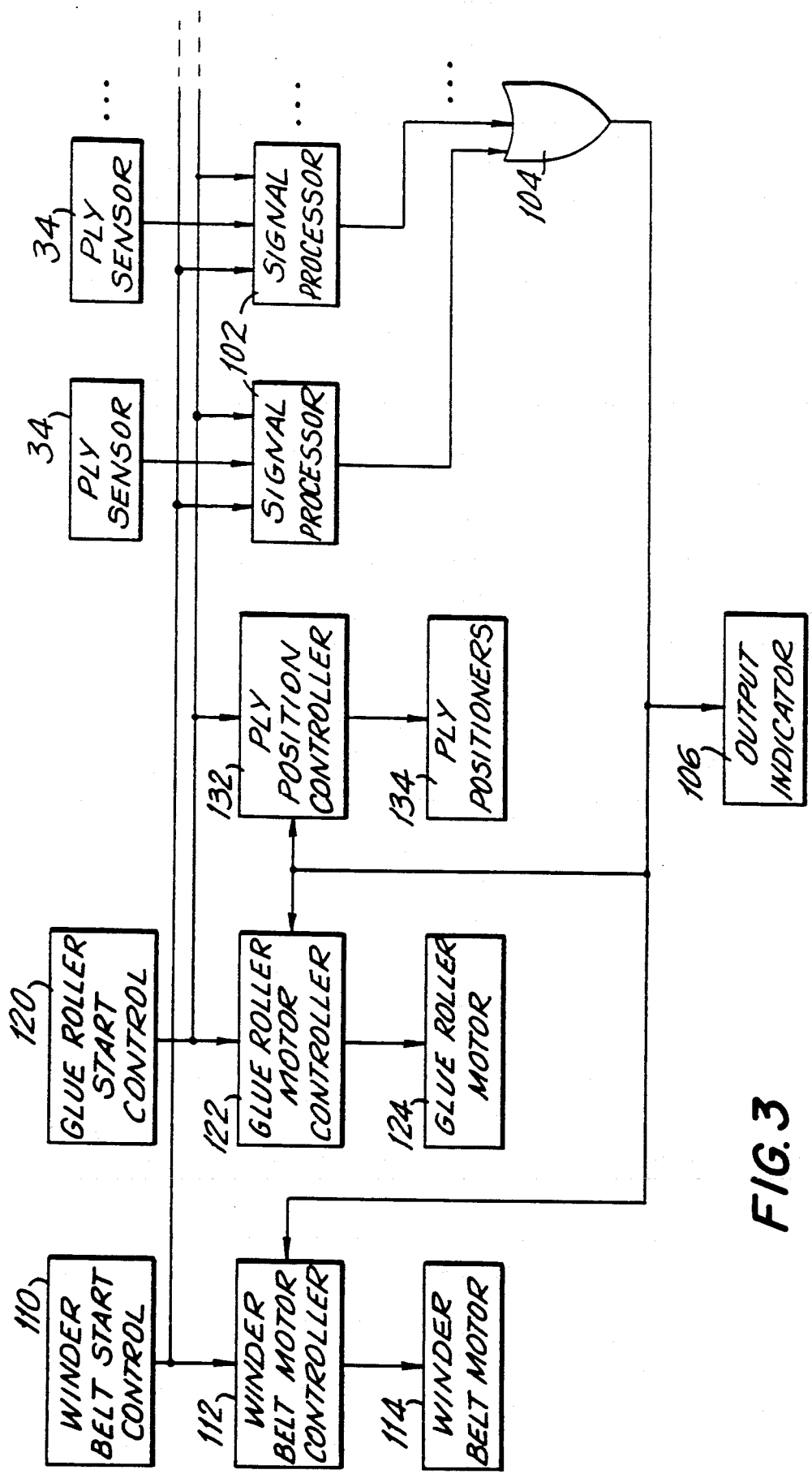
FIG. 3 is a block diagram of illustrative apparatus for controlling the tube winder of FIG. 1 in accordance with this invention.

As shown in FIG. 3, the output signal of each ply sensor 34 is applied to a respective one of signal processors 102. Each signal processor 102 also receives the output signal of winder belt start control 110 and the output signal of glue roller start control 120. Each of controls 110 and 120 may be a push-button type switch for producing a momentary output signal when depressed by the human operator of the system. Operation of winder belt start control 110 causes winder belt motor controller 112 to start and continue to operate winder belt motor 114 which drives belt 60. Operation of glue roller start control 120 similarly causes glue roller motor controller 122 to start and continue to operate glue roller motor 124 which drives glue roller 32. Operation of glue roller start control 120 also causes ply position controller 132 to operate ply positioners 134 so that the plies 12 in the lanes having sensors 34 are brought into contact with the surface of glue roller 32. Ply positioners 134 are elements which place plies 12 in contact with the cylindrical surface of glue roller 32 when the machine is operating and the glue roller is rotating, and which lift plies 12 off the glue roller when the machine stops in order to prevent the plies from sticking to the glue roller while the glue roller is stopped. Illustrative ply positioners 134 are shown in more detail in above-mentioned application Ser. No. 493,755.

Figure 4:
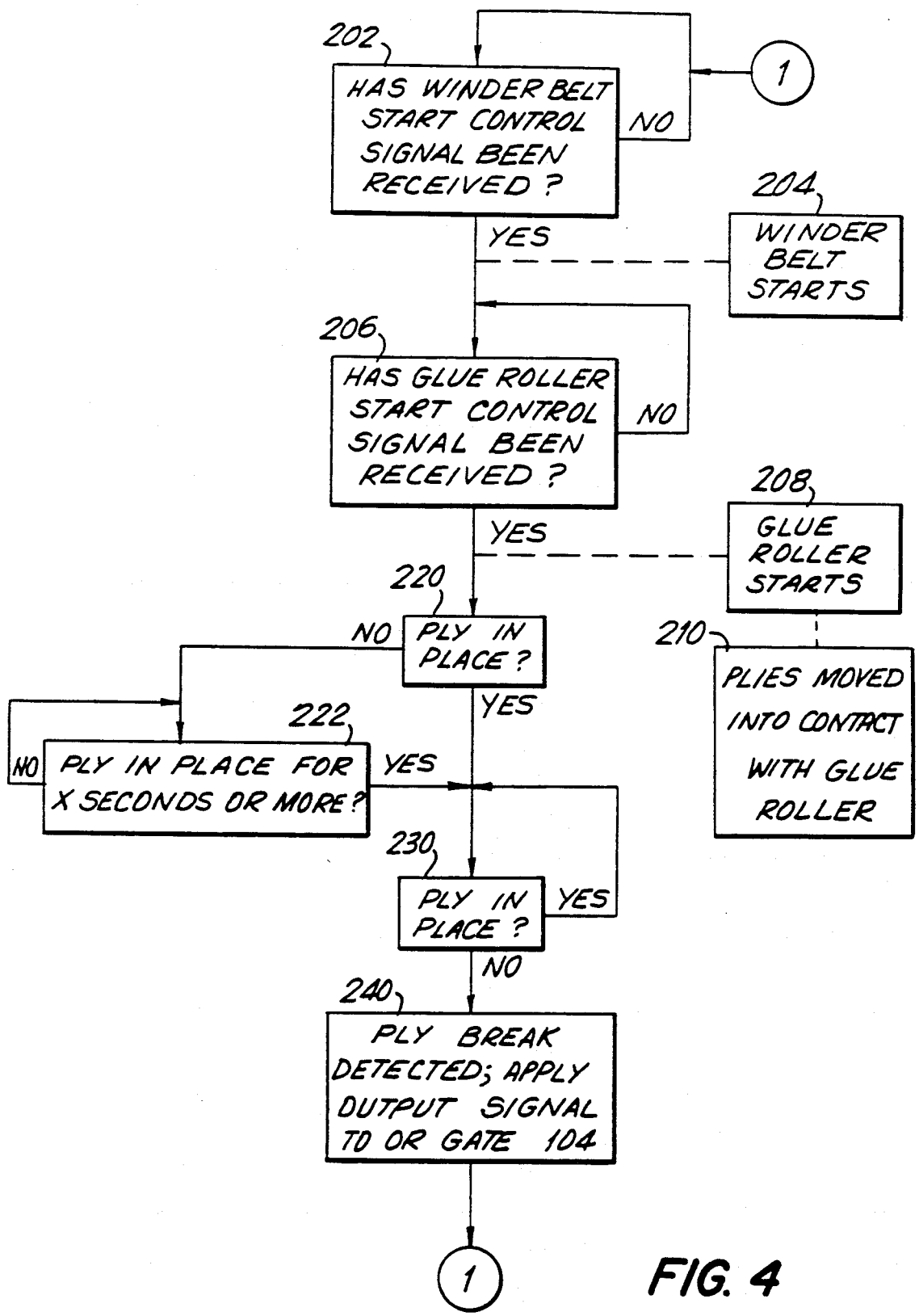
FIG. 4 is a flow chart of illustrative logical operations performed by certain elements in FIG. 3 in accordance with this invention.

Each of signal processors 102 performs the logical steps shown in FIG. 4. This logic basically waits at step 202 until winder belt start control 110 is operated. When that occurs, winder belt 60 starts (as indicated by block 204) and control passes to step 206. The logic again waits at step 206 until glue roller start control 120 is operated. When that occurs, glue roller 32 starts (as indicated by block 208), the plies 12 are moved into contact with the glue roller by ply positioners 134 (as indicated by block 210), and control passes to step 220.

In step 220 the output signal of the associated ply sensor 34 is compared to a predetermined threshold value in order to determine whether the photocell 34b in that sensor is receiving at least the amount of light required to indicate that a ply 12 is present opposite that sensor. If that amount of light is being received, a ply is in place in the associated lane and control passes to step 230. Otherwise, control passes to step 222.

Step 222 is provided so that if a ply is not in place in a given lane when the machine is first started, a ply can be subsequently added in that lane and the ply break sensing protection for that lane will thereafter be automatically activated. Step 222 is basically similar to step 220 in that it involves comparing the output signal of the associated sensor 34 to a predetermined threshold value in order to determine whether or not the photocell 34b in that sensor is receiving at least the amount of light that it would receive if a ply were present. However, in order to give the operator of the machine a few seconds to get a new ply properly in place, step 222 prevents activation of the ply break detection portion of the logic until the ply has been continuously detected as present for at least a predetermined time interval (referred to as "x seconds" in step 222). Until that has occurred, the logic remains at step 222. But as soon as a ply has been continuously detected for x seconds, step 222 passes control to step 230, thereby activating the ply break detection logic for the associated lane.

Step 230 is again similar to step 220 in that the output signal of the associated ply sensor 34 is repeatedly compared to a predetermined threshold value to make sure that the photocell 34b in that sensor continues to receive at least the amount of light which indicates that the ply is present in front of the sensor. As long as that is the case, the logic remains at step 230. However, as soon as the sensor 34 output signal indicates that the ply is no longer present, control passes from step 230 to step 240 which causes the affected signal processor 102 to apply to OR gate 104 (FIG. 3) a signal indicating that a ply has broken between glue roller 32 and mandrel 50.

When OR gate 104 receives a signal of the type described above from any of signal processors 102, OR gate 104 produces an output signal which is applied to output indicator 106, winder belt motor controller 112, glue roller motor controller 122, and ply position controller 132. In response to this signal, output indicator 106 produces an output (e.g., an audible and/or visible output) to alert the operator of the machine to a malfunction, and ply position controller 132 causes ply positioners 134 to remove plies 12 from contact with glue roller 32. Also in response to this signal, glue roller motor controller 122 stops glue roller motor 124, and winder belt motor controller 112 stops winder belt motor 114. Accordingly, the effect of a ply break indicating output signal from the signal processor 102 for any active lane is to shut down the machine and alert the machine operator that a malfunction has occurred.

Returning to FIG. 4, after step 240 has been performed, control returns to step 202 in which the logic waits for the machine to be restarted by the operator.

Figure 5:
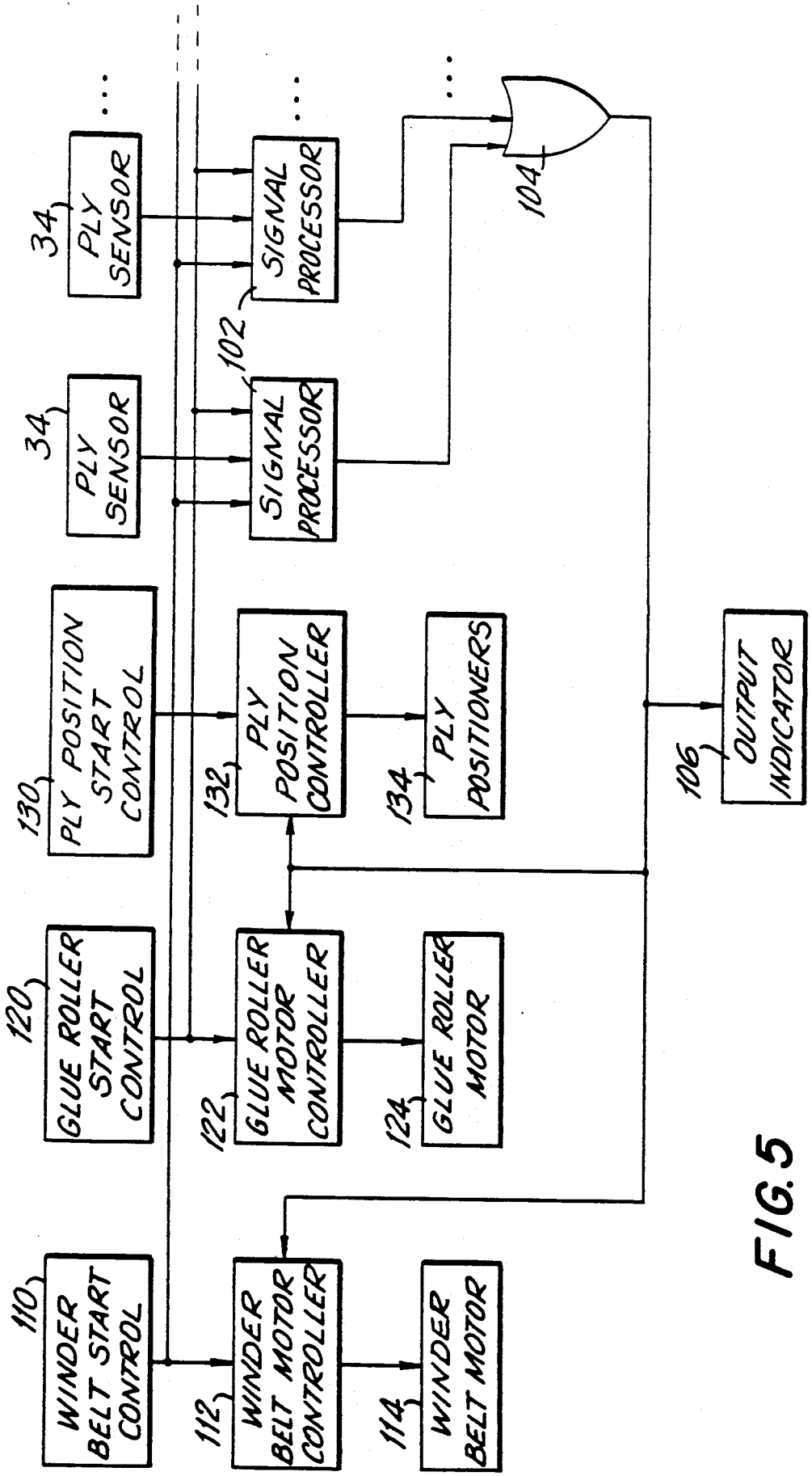
FIG. 5 is a block diagram of an alternative embodiment of apparatus for controlling the tube winder of FIG. 1 in accordance with this invention.
Figure 6:
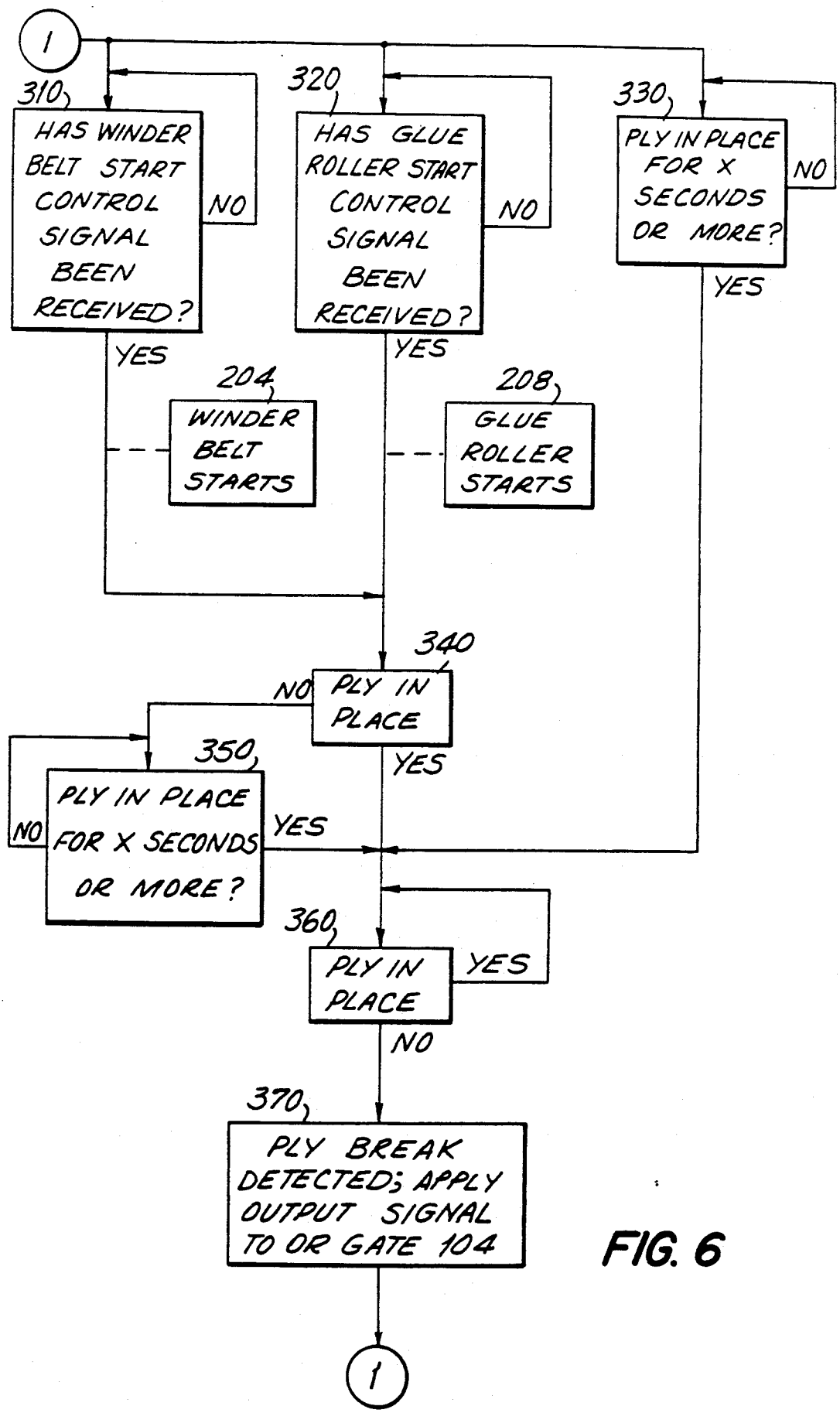
FIG. 6 is a flow chart of illustrative logical operations performed by certain elements in FIG. 5 in accordance with this invention.

FIGS. 5 and 6 show an alternative embodiment of the invention with somewhat different operating characteristics. FIG. 5 is similar to FIG. 3 except that in FIG. 5 ply position controller 132 has its own ply position start control 130. Accordingly, in FIG. 5 each of winder belt motor 114, glue roller motor 124, and ply positioners 134 can be started independently (although it may be desirable to have certain interlocks among elements 110, 120, and 130 (e.g., so that winder belt motor 114 cannot be started unless glue roller motor 124 is already operating)). FIG. 6 then shows alternative ply break detection logic executed by each of signal processors 102 in FIG. 5 as will now be described.

The logic of FIG. 6 waits at the top of that FIG. until any one of events 310, 320, or 330 has occurred. For example, if the first of these events to occur is operation of winder belt start control 110, then step 310 causes control to pass to step 340 (with winder belt 60 being started as indicated by block 204). Once control passes to step 340 in this manner, tests 320 and 330 are no longer performed. Alternatively, if the first of events 310, 320, and 330 to occur is operation of glue roller start control 120, then step 320 causes control to pass to step 340 (with glue roller 32 being started as indicated by block 208). Again, once control passes to step 340 in this manner, tests 310 and 330 are no longer performed. As the third alternative, if the first of events 310, 320, and 330 to occur is that a ply is detected in the associated lane for x seconds or more, then step 330 causes control to pass to step 360, after which tests 310 and 320 are no longer performed. (Step 330 is similar to step 222 in FIG. 4.)

Step 340 (which is similar to step 220 in FIG. 4) tests whether a ply is present in the associated lane. If so, then control passes to step 360 in which the ply break detection for the associated lane is activated because the lane has been found to be in use. (Step 360 can, of course, also be reached directly from step 330 as described above.) If a ply is not found to be in place when step 340 is performed, then control passes to step 350, which (like step 222 in FIG. 4) prevents activation of the ply break detection for the associated lane until after a ply has been detected in that lane for x seconds or more. Only when that has occurred does step 350 pass control to step 360, thereby activating the ply break detection for the associated lane.

Step 360 is similar to step 230 in FIG. 4 and is performed repeatedly until the ply in the associated lane is no longer found to be present. This indicates a break in the associated ply, and step 360 therefore then passes control to step 370. Step 370 is exactly the same as step 240 in FIG. 4 and has the same effect on the apparatus of FIG. 5 that performance of step 240 in FIG. 4 has on the apparatus of FIG. 3. After performing step 370, control returns to steps 310, 320, and 330 to await restarting of the winder.

As compared to the embodiment shown in FIGS. 3 and 4, the embodiment shown in FIGS. 5 and 6 has the possible advantage of activating the ply break detection system earlier in the winder starting sequence.

It will be apparent to those skilled in the art that signal processors 102 in FIGS. 3 and 5 can be implemented in any of a variety of ways. For example, programmable logic devices can be used, or all of elements 102 can be combined in a single, suitably programmed, general purpose microprocessor.

It will be understood that the foregoing is merely illustrative of the principles of this invention and that various modifications can be made by those skilled in the art without departing from the scope and spirit of the invention. For example, step 220 in FIG. 4 is optional and can be eliminated if desired, with control always passing from step 206 to step 222. This would mean, for example, that when the machine was started, the ply break protection would not be activated for any lane for the first x seconds of operation. But this is unlikely to cause a problem because the operator will almost certainly watch the machine closely during startup. As another example of modifications within the scope of this invention, various other types of ply sensors 34 (e.g., microswitches) can be used if desired.

The invention claimed is:

1. In apparatus including means for supplying a plurality of longitudinal plies, a mandrel, means for pulling said plies longitudinally toward said mandrel and winding said plies around said mandrel in a spiral to form a spiral-wound tube, and glue application means disposed intermediate said means for supplying and said means for pulling and winding for applying glue to at least some of said plies, the improvement comprising:
   first means disposed between said glue application means and said means for pulling and winding for sensing whether each of said plies to which glue is applied is present at the location of said first means;
   second means responsive to said first means for stopping said means for pulling and winding if said first means indicates that any of said plies to which glue is applied is not present at the location of said first means; and
   third means responsive to said first means for removing all of said plies to which glue is applied from said glue application means if said first means indicates that any of said plies to which glue is applied is not present at the location of said first means.

2. The apparatus defined in claim 1 wherein said improvement further comprises:
   fourth means responsive to said first means for stopping said glue application means if said first means indicates that any of said plies to which glue is applied is not present at the location of said first means.

3. The apparatus defined in claim 2 wherein said glue application means includes a rotating roller, and wherein said fourth means comprises:
   means for stopping rotation of said roller if said first means indicates that any of said plies to which glue is applied is not present at the location of said first means.

4. In apparatus including means for supplying a plurality of longitudinal plies, a mandrel, means for pulling said plies longitudinally toward said mandrel and winding said plies around said mandrel in a spiral to form a spiral-wound tube, and glue application means disposed intermediate said means for supplying and said means for pulling and winding for applying glue to at least some of said plies, the improvement comprising:

first means disposed between said glue application means and said means for pulling and winding for sensing and indicating whether each of said plies to which glue is applied is present at the location of said first means;
second means responsive to said first means for identifying which of said plies said first means has indicated have been present for at least a predetermined time interval;
third means responsive to said first and second means for producing an output signal when said first means indicates that any of said plies previously identified by said second means is no longer present;
fourth means responsive to said output signal for stopping said means for pulling and winding; and
fifth means responsive to said output signal for removing all of said plies to which glue is applied from said glue application means.

5. The apparatus defined in claim 4 wherein said improvement further comprises:
sixth means responsive to said output signal for stopping said glue application means.

6. The apparatus defined in claim 5 wherein said glue application means includes a rotating roller, and wherein said sixth means comprises:
means for stopping rotation of said roller.

7. In a method including the steps of supplying a plurality of longitudinal plies, applying glue to at least some of said plies by glue application means, and pulling said plies longitudinally toward a mandrel and winding said plies in a spiral around said mandrel by pulling and winding means to form a spiral-wound tube, the improvement comprising the steps of:

sensing whether each of said plies to which glue is applied is present between said glue application means and said means for pulling and winding;
stopping said means for pulling and winding of any of said plies to which glue is applied is not present between said glue application means and said means for pulling and winding; and
removing all of said plies to which glue is applied from said glue application means if any of said plies to which glue is applied is not present between said glue application means and said means for pulling and winding.

8. The apparatus defined in claim 7 wherein said improvement further comprises the step of:
stopping said glue application means if any of said plies to which glue is applied is not present between said glue application means and said means for pulling and winding.

9. The apparatus defined in claim 8 wherein said glue application means includes a rotating roller, and wherein said step of stopping said glue application means comprises the step of:
stopping rotation of said roller.

10. In a method including the steps of supplying a plurality of longitudinal plies, applying glue to at least some of said plies by glue application means, and pulling said plies longitudinally toward a mandrel and winding said plies in a spiral around said mandrel by pulling and winding means to form a spiral-wound tube, the improvement comprising the steps of:

sensing whether each of said plies to which glue is applied is present between said glue application means and said means for pulling and winding in order to produce an output indication for each of said plies while said ply is thus present;
timing the duration of said output indication for each of said plies in order to identify those plies which have been indicated to be present for at least a predetermined time interval;
producing an output signal when said output indication ceases for any ply previously identified in said timing step;
stopping said means for pulling and winding in response to occurrence of said output signal; and
removing all of said plies to which glue is applied from said glue application means in response to occurrence of said output signal.

11. The method defined in claim 10 wherein said improvement further comprises the step of:
stopping said glue application means in response to occurrence of said output signal.

12. The method defined in claim 11 wherein said glue application means includes a roller, and wherein said step of stopping said glue application means comprises the step of:
stopping rotation of said roller.

* * * * *